(12) United States Patent
Milburn, Jr.

(10) Patent No.: US 10,820,752 B2
(45) Date of Patent: Nov. 3, 2020

(54) MULTI-LEVELED COOKING APPARATUS (71) Applicant: Charles Wayne Milburn, Jr., Opelousas, CA (US)

(72) Inventor: Charles Wayne Milburn, Jr., Opelousas, CA (US)

(*) Notice: Subject to any disclaimer, the term of this patent is extended or adjusted under 35 U.S.C. 154(b) by 0 days.

(21) Appl. No.: 16/036,911

(22) Filed: Jul. 16, 2018

(65) Prior Publication Data

US 2019/0014946 A1 Jan. 17, 2019

Related U.S. Application Data (60) Provisional application No. 62/532,688, filed on Jul. 14, 2017.

(51) Int. Cl.
A47J 37/07 (2006.01)
F24C 15/16 (2006.01)
A47J 37/06 (2006.01)
F24C 3/04 (2006.01)
F24C 3/08 (2006.01)
F24B 1/02 (2006.01)

(52) U.S. Cl.
CPC ....... *A47J 37/0713* (2013.01); *A47J 37/0647* (2013.01); *F24C 15/16* (2013.01); *A47J 37/0682* (2013.01); *F24B 1/026* (2013.01); *F24C 3/042* (2013.01); *F24C 3/082* (2013.01)

(58) Field of Classification Search
CPC .............. A47J 37/0713; A47J 37/0682; A47J 37/0647; F24C 15/16; F24C 3/042; F24C 3/082; F24B 1/026

USPC ....... 126/41 R, 25 AA, 25 R, 25 B, 6, 4, 30, 126/21 A, 1 AC, 31, 1 R, 28, 36, 39 B, 126/15 R, 15 A, 61, 88, 67, 77, 80
See application file for complete search history.

(56) References Cited

U.S. PATENT DOCUMENTS

| 4,512,249 A | * | 4/1985 | Mentzel | A47J 37/0704 126/25 R |
| 5,891,498 A | * | 4/1999 | Boehler | A23B 4/052 426/314 |
| 5,996,572 A | * | 12/1999 | Ilagan | A47J 37/0786 126/21 A |
| 7,025,589 B2 | * | 4/2006 | Werz | A21B 1/28 431/328 |

(Continued)

Primary Examiner — Grant Moubry
Assistant Examiner — Rabeeul I Zuberi (57) ABSTRACT A multi-leveled cooking apparatus is an apparatus that is used to prepare food. The apparatus includes an enclosure, a heat source, at least one convectively-heated cooking mechanism, a radiatively-heated cooking mechanism, a first duct, and a second duct. The enclosure is used as a structural base to mount the aforementioned components, and to maintain and regulate temperature fluctuations. The heat source sends hot air through the first duct and the second duct to heat the at least one convectively-heated cooking mechanism. The heat source is also in contact with the radiatively-heated cooking mechanism. A series of tubes within the enclosure provide adequate dispersal of combustible gaseous material, and an ignition starter allows the user to ignite the gas contained within the present invention. Removable grates are arranged at various heights within the enclosure, allowing customization of the size of the working space as well as improving accessibility for sanitization.

10 Claims, 8 Drawing Sheets (56) References Cited

U.S. PATENT DOCUMENTS

| | | | | |
|---|---|---|---|---|
| 2003/0213484 A1* | 11/2003 | Alden | ............... | A47J 37/0713 |
| | | | | 126/41 R |
| 2004/0123857 A1* | 7/2004 | Viraldo | ............... | A47J 37/0704 |
| | | | | 126/9 R |
| 2005/0235980 A1* | 10/2005 | Hansen | ............... | A21B 3/00 |
| | | | | 126/19 R |
| 2010/0218691 A1* | 9/2010 | Adams | ............... | A23B 4/044 |
| | | | | 99/482 |
| 2012/0073557 A1* | 3/2012 | Knight | ............... | F24B 1/22 |
| | | | | 126/19 R |

* cited by examiner

MULTI-LEVELED COOKING APPARATUS

The current application claims a priority to the U.S. Provisional Patent application Ser. No. 62/532,688 filed on Jul. 14, 2017. The current application is filed on Jul. 16, 2018 while Jul. 14, 2018 was on a weekend.

FIELD OF THE INVENTION

The present invention generally relates to a cooking tool. More specifically, the present invention relates to a device with removable grates that allows the user to perform a variety of food preparation techniques and enables efficient cleaning of the present invention upon cooking completion.

BACKGROUND OF THE INVENTION

Traditional grills offer users the ability to cook food using gas, charcoal, or similar combustible materials outdoors. Many traditional grills are structured similarly, with a body resting on a base, a hollow bottom section, and a cover. The combustible material is placed inside the hollow bottom part of the body, and a grate is then placed on top of the burning combustible material. This arrangement allows food items to be cooked on top of the grate. However, this traditional structure of outdoor grills limits the cooking methods the user can choose to prepare the food items. Newer models which try to overcome the limits of traditional grills often do so by increasing the size of the grills and consequently providing great cooking area. Some even offer cooking areas where the user can cook the food with different cooking methods, such as baking, frying, or smothering.

A few grills even attempt to provide modifications to grilling specifically, exploring the possibility of providing alternative means of heat for different cooking methods. Unfortunately, the addition of all these features increase the size of the grills exponentially, which then limits the transportability of the invention as well as the accessibility of the same. Another problem most of these additions create is the difficulty of cleaning the individual parts of said grills. The addition of extra features on the grills usually requires a large number of parts, which are often difficult or impossible to remove. Consequently, the user finds the task of fully cleaning the grill cumbersome, resulting in only the bigger parts being cleaned and the smaller, harder to reach parts accumulating dirt and waste. Thus, a grill with fully removable inserts which allows the user to cook food with a variety of cooking methods is beneficial and necessary.

The present invention is a multi-leveled cooking apparatus that allows the user to multi-task and cook food with different cooking methods. A grill which allows the user to multi-task and use different cooking methods is beneficial and necessary, as oftentimes the user requires the ability to cook different food items with different methods at the same time. Another objective of the present invention is to provide a grill apparatus which comprises fully removable inserts. A grill with fully removable inserts is beneficial and necessary, as such functionality allows the user to modify the cooking device in different ways to use different cooking methods. In addition, a grill with fully-removable inserts allows the user to easily clean and replace different parts of the present invention, which results in better maintenance and thus improved durability. Another objective of the present invention is to provide a cooking unit which is safe to operate. Traditional grills and cooking means are often dangerous to use as the source of heat is exposed and nearby people, especially children, can potentially hurt themselves by accidentally touching the hot areas around them. Additional advantages of the present invention may be realized and attained by means of the instrumentalities and combinations particularly pointed out in the section entitled "detailed description of the invention". Further benefits and advantages of the embodiments of the present invention will become apparent from consideration of the following detailed description given with reference to the accompanying drawings, which specify and show preferred embodiments of the present invention.

DETAILED DESCRIPTION OF THE INVENTION

All illustrations of the drawings are for the purpose of describing selected versions of the present invention and are not intended to limit the scope of the present invention.

Figure 1:
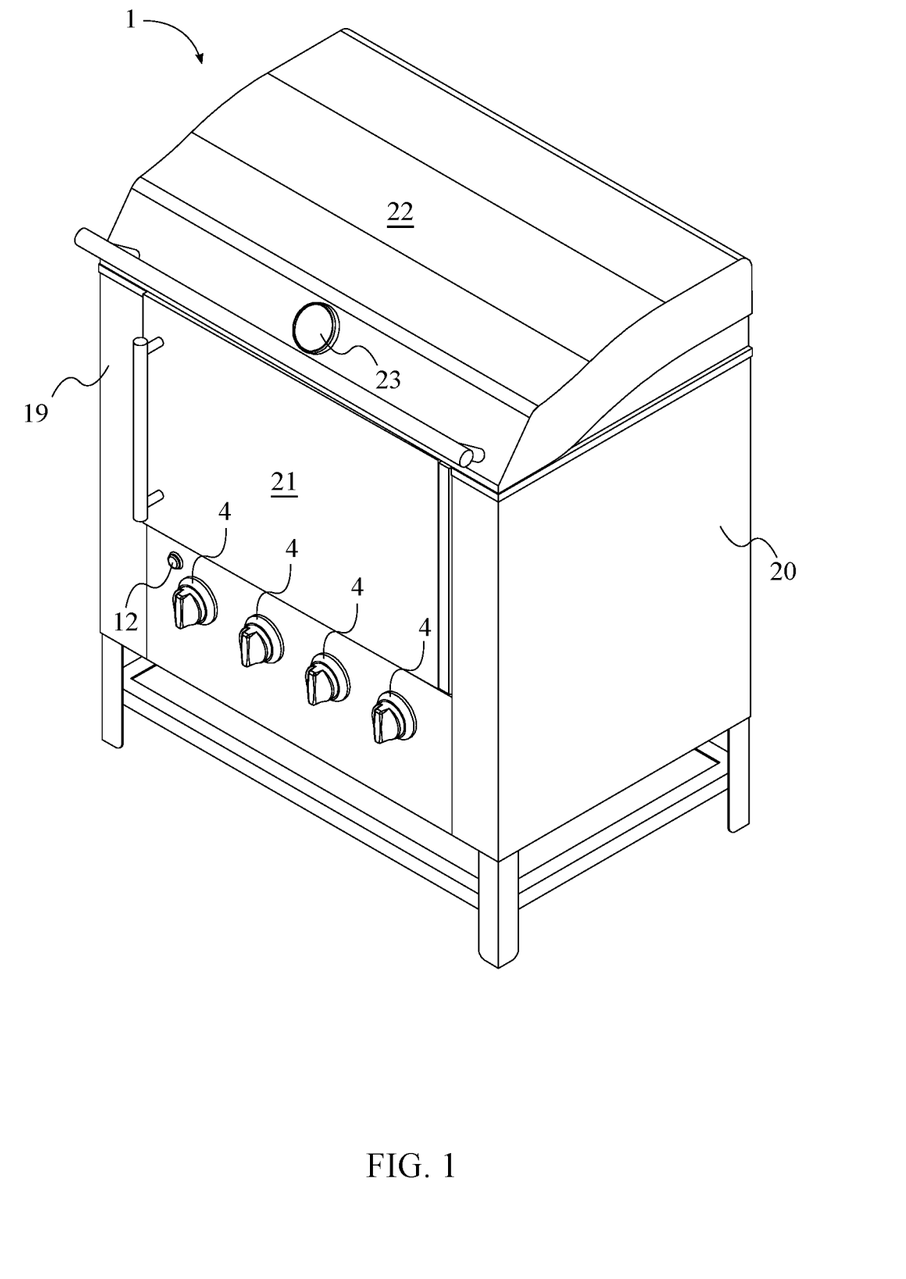
FIG. 1 is a front-right perspective view of the present invention.
Figure 2:
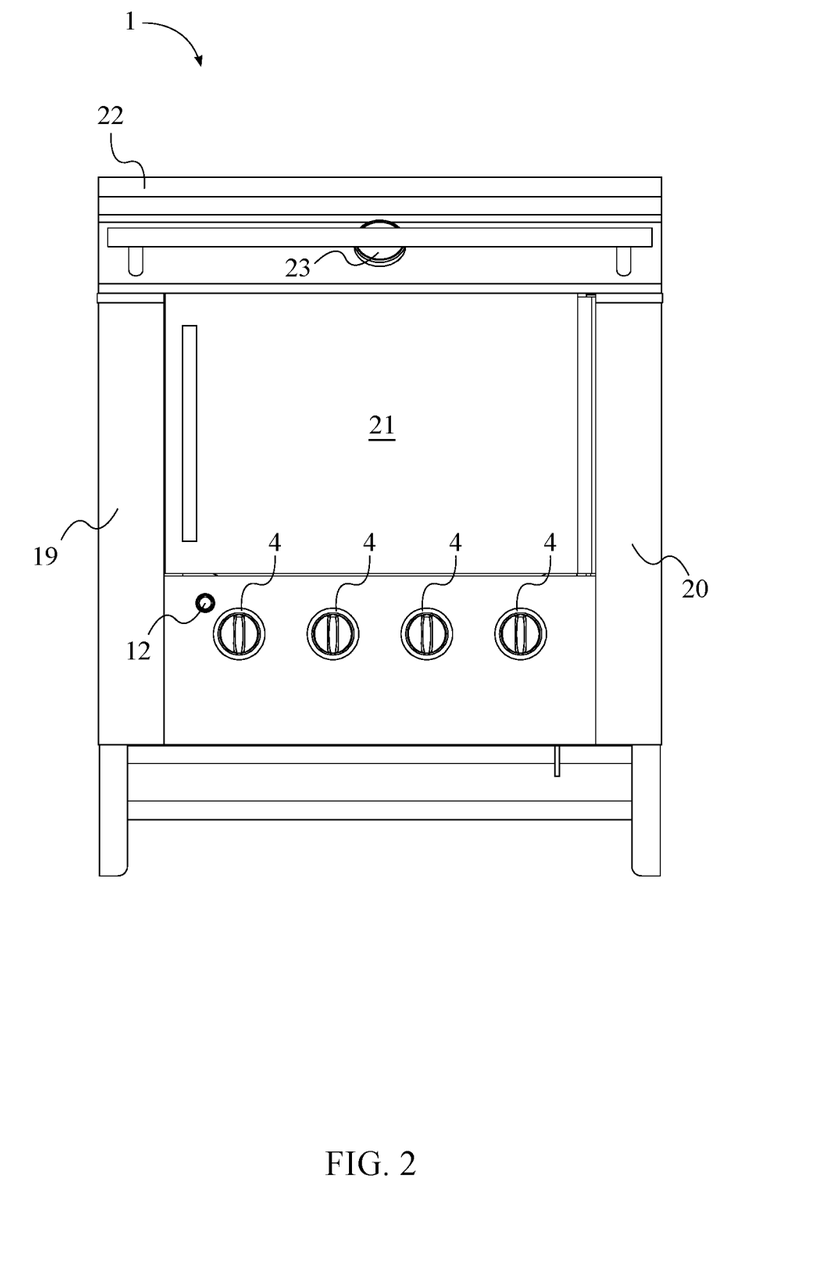
FIG. 2 is a front view of the present invention.

The present invention is a multi-leveled cooking apparatus that allows a user to prepare food with several popular methods, including grilling, baking, broiling, rotisserie, frying, boiling, smothering, and more. The present invention provides different spaces which heat radiatively or convectively through the sides by directing the heat generated below. The present invention comprises an enclosure 1, a heat source 5, at least one convectively-heated cooking mechanism 13, a radiatively-heated cooking mechanism 18, a first duct 19, and a second duct 20, as seen in FIGS. 1 and 2. The enclosure 1 serves as the housing for the heat source 5, the at least one convectively-heated cooking mechanism 13, and the radiatively-heated cooking mechanism 18, the first duct 19, and the second duct 20. The heat source 5 is a mechanism that provides heat throughout the enclosure 1, the first duct 19, and the second duct 20. The at least one convectively-heated cooking mechanism 13 is a space in which heat transfers to food convectively, by means of heated air traversing from the heat source 5 through the first duct 19 and the second duct 20. The radiatively-heated cooking mechanism 18 is a space in which heat transfers radiatively, directly from the heat source 5 and into the food. The first duct 19 and the second duct 20 are spaces on either side of the enclosure 1 through which heat from the heat source 5 transfers to the at least one convectively-heated cooking mechanism 13.

Figure 3:
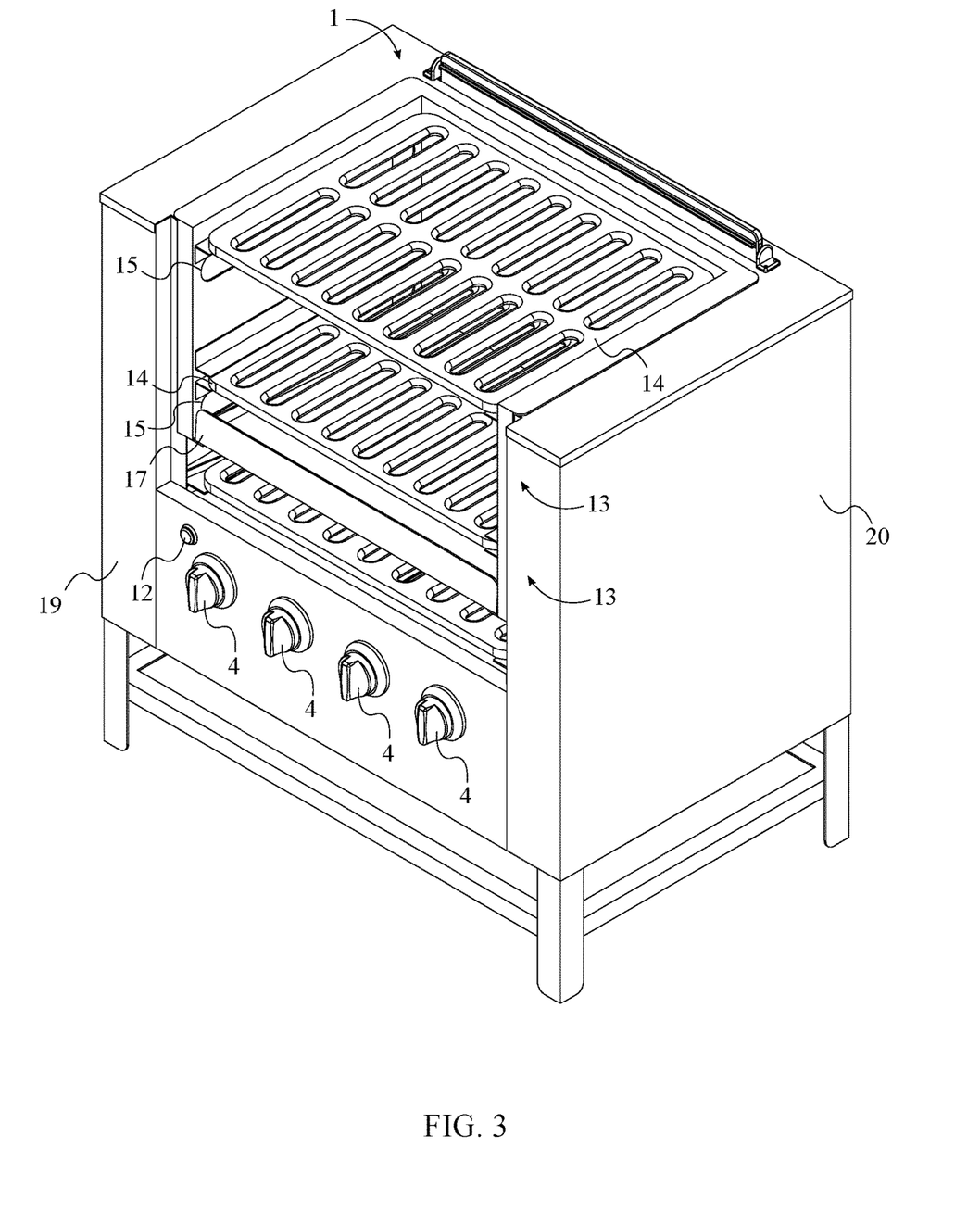
FIG. 3 is a front-right perspective view of the present invention without the hood or the access door.

The general configuration of the aforementioned components allows the present invention to efficiently and effectively heat items contained within the at least one convectively-heated cooking mechanism 13 and the radiatively-heated cooking mechanism 18. The enclosure 1 comprises an open end 2 and a closed end 3. The open end 2 is the area in which the user may input food and cookware. The closed end 3 is the sealed segment of the enclosure 1, opposite the open end 2, that prevents heat or gas from escaping the present invention. The heat source 5, the radiatively-heated cooking mechanism 18, the at least one convectively-heated cooking mechanism 13, the first duct 19, and the second duct 20 are mounted within the enclosure 1. This arrangement ensures that the heat source 5, the radiatively-heated cooking mechanism 18, the at least one convectively-heated cooking mechanism 13, the first duct 19, and the second duct 20 are all positioned appropriately relative to each other and that heat does not escape and cause inefficiencies, as seen in FIG. 3. The heat source 5 is positioned adjacent to the closed end 3. Such positioning allows the heat source 5 to efficiently distribute heat through the enclosure 1, as heat consequently rises naturally to pervade the at least one convectively-heated cooking mechanism 13. The radiatively-heated cooking mechanism 18 is positioned offset from the heat source 5. This enables heat from fires generated by the heat source 5 to directly heat the radiatively-heated cooking mechanism 18.

Figure 4:
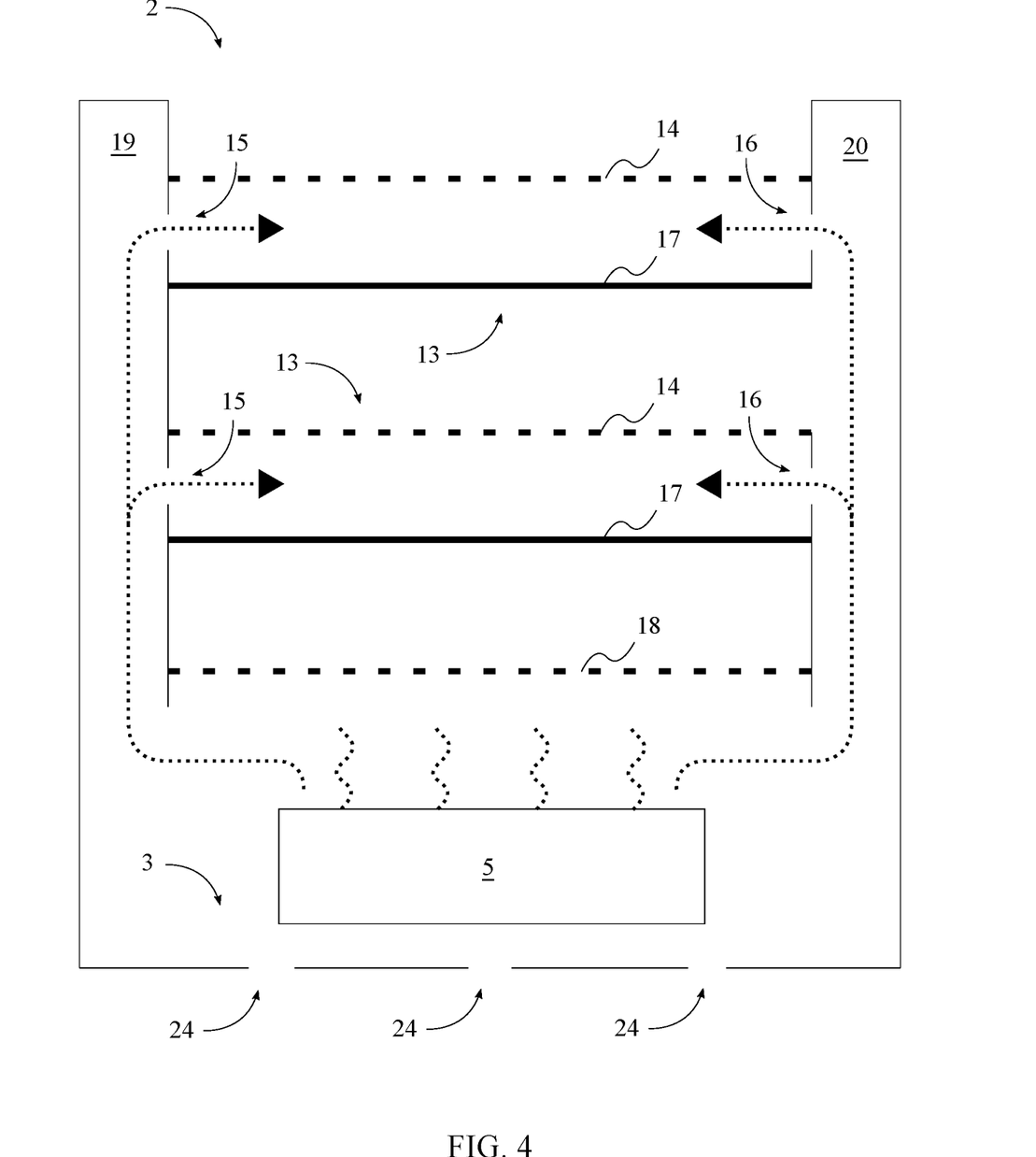
FIG. 4 is a front internal schematic view of the heating mechanism.

Conversely, the at least one convectively-heated cooking mechanism 13 is positioned offset from the radiatively-heated cooking mechanism 18, opposite the heat source 5. This arrangement prevents the at least one convectively-heated cooking mechanism 13 from collecting radiative heat, thus ensuring the availability of varied heating methods, as seen in FIG. 4. The first duct 19 and the second duct 20 traverse from the closed end 3 to the open end 2. This arrangement ensures that heat transmits from the heat source 5 to the at least one convectively-heated cooking mechanism 13. The first duct 19 and the second duct 20 are positioned opposite each other about the enclosure 1. In this way, the first duct 19 and the second duct 20 evenly supply heat from either side of the at least one convectively-heated cooking mechanism 13. The heat source 5 is in fluid communication with the at least one convectively-heated cooking mechanism 13 through the first duct 19 and the second duct 20. This arrangement allows heat generated and controlled by the heat source 5 to be convectively transferred through the air flowing within the first duct 19 and the second duct 20.

The user requires access in order to place food and cooking equipment into the radiatively-heated cooking mechanism 18. The present invention comprises an access door 21. The access door 21 is an insulating surface which allows the user to add items to the radiatively-heated cooking mechanism 18. The access door 21 is laterally integrated into the enclosure 1. This enables heat retention during cooking, as well as access for the user to insert food and cooking items into the radiatively-heated cooking mechanism 18. The access door 21 is positioned in between the open end 2 and the closed end 3. This arrangement ensures that the access door 21 fully insulates contained food and cooking items. The access door 21 is positioned adjacent to the radiatively-heated cooking mechanism 18. By positioning the access door 21 thusly, the access door 21 is able to toggle between the open/closed states of the radiatively-heated cooking mechanism 18.

Several types of cooking, including smoking and some types of grilling, are made possible by the containment of pressure upon the food being cooked. To this end, the present invention further comprises a hood 22. The hood 22 is a cover that can be closed in order to increase pressure and heat on cooking food and to provide exposure to smoke necessary for infusing food with additional flavor. The hood 22 is hingedly attached to the enclosure 1, adjacent to the open end 2. In this way, the user can adjust the pressure and smoke content within the enclosure 1 by pivoting the hood 22 over the open end 2. When the hood 22 and the enclosure 1 are in the closed configuration, the hood 22 is hermetically attached onto the open end 2. This prevents smoke from escaping and allows a buildup of pressure to reduce cooking time and make different cooking techniques possible. Moreover, the present invention further comprises a temperature gauge 23. The temperature gauge 23 is a sensor that detects and subsequently displays the temperature within the enclosure 1. In an exemplary embodiment, the temperature gauge 23 is externally connected to the hood 22. This provides the user a convenient location for viewing the temperature within the enclosure 1. The temperature gauge 23 is in fluid communication with the enclosure 1. This arrangement enables the user to utilize the temperature gauge 23 to monitor the temperature within the enclosure 1, thus providing the user with a means of precisely controlling the rate at which food cooks.

Figure 7:
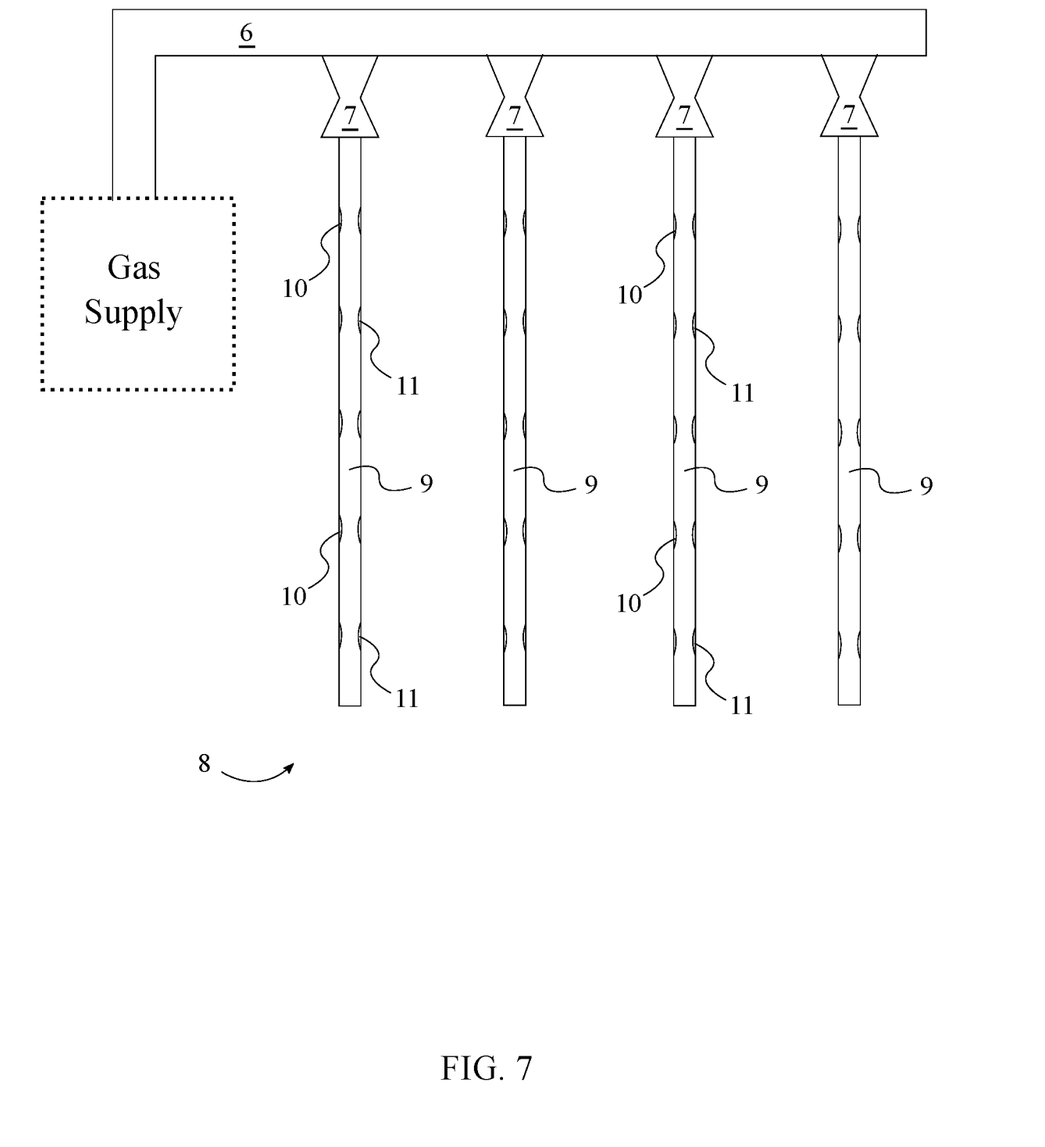
FIG. 7 is a top schematic view of the heat source.

In order to control heat within the enclosure 1, the heat source 5 regulates the heat generated within the enclosure 1. The heat source 5 comprises a manifold 6, a plurality of gas-dispensing tubes 8, a plurality of valves 7, and an ignition starter 12. The manifold 6 is a hollow cylindrical extrusion used to distribute a combustible gas (e.g. propane) from a retention tank to each of the plurality of gas-dispensing tubes 8, as seen in FIG. 7. The plurality of gas-dispensing tubes 8 is a series of hollow cylindrical extrusions that extend within the enclosure 1 to carry and distribute the combustible gas. The ignition starter 12 is able to generate a spark in order to ignite the combustible gas flowing through the heat source 5. Each of the plurality of gas-dispensing tubes 8 is positioned parallel to each other and is distributed across the closed end. This ensures even coverage of the enclosure 1 with the combustible gas during use. The manifold 6 is positioned perpendicularly to the plurality of gas-dispensing tubes 8. In this way, the manifold 6 can provide proper flow to each of the plurality of gas-dispensing tubes 8. Each of the plurality of gas-dispensing tubes 8 is in fluid communication with the manifold 6 through a corresponding valve from the plurality of valves 7. This arrangement allows the user to adjust the flow of the combustible gas with the corresponding value through the plurality of gas-dispensing tubes 8. The ignition starter 12 is integrated into the enclosure 1, adjacent to a peripheral tube from the plurality of gas-dispensing tubes 8. In this arrangement, the ignition starter 12 can interact with the combustible gas expelled from the peripheral tube in order to sequentially ignite the remaining tubes from the plurality of gas-dispensing tubes 8.

Figure 6:
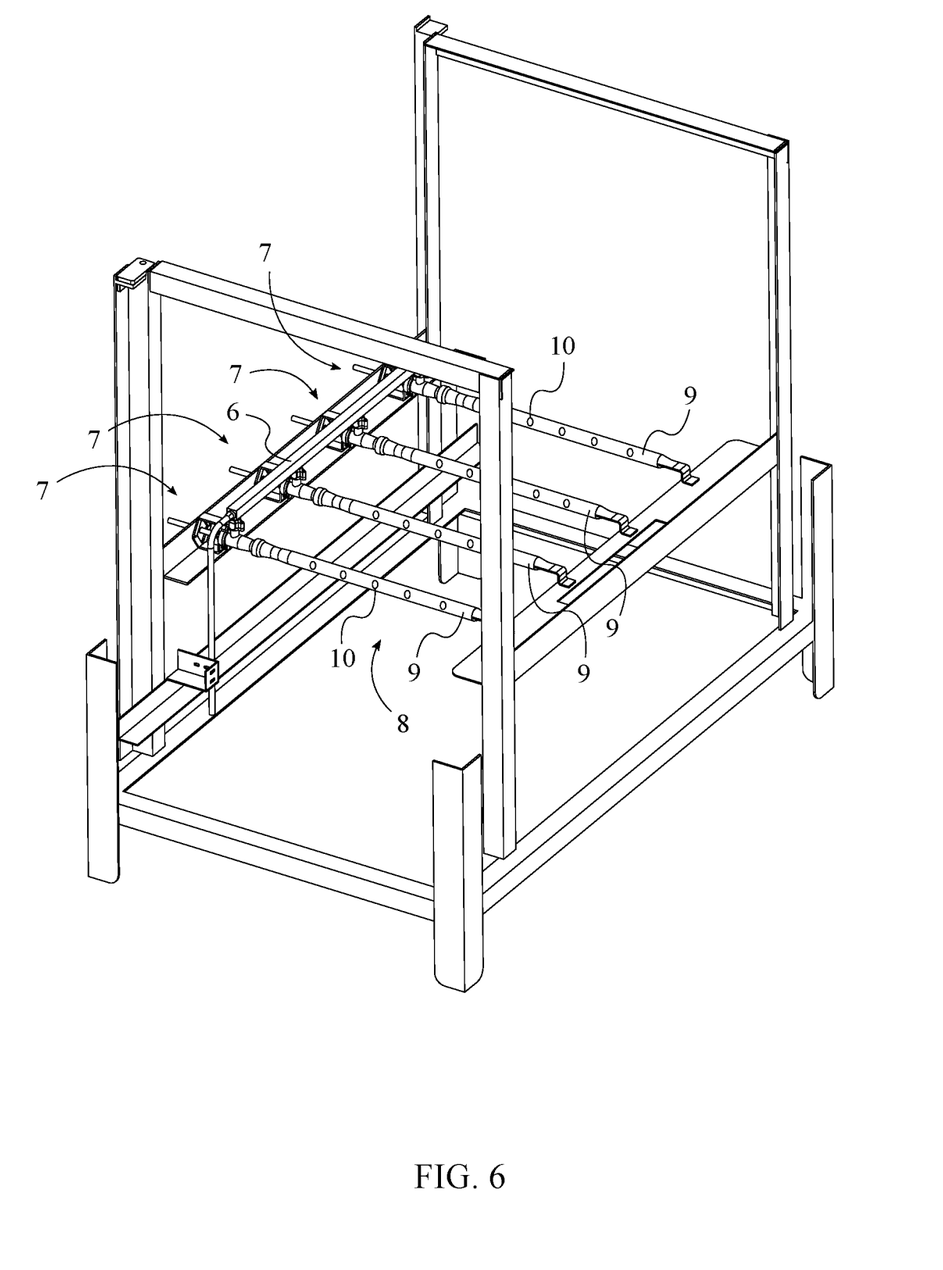
FIG. 6 is a rear-right perspective view of the present invention without the enclosure.

The heat source 5 can moderate the amount of heat supplied to the radiatively-heated cooking mechanism 18 and the at least one convectively-heated cooking mechanism 13. To this end, the enclosure 1 comprises a plurality of knobs 4. The plurality of knobs 4 is a set of grips that interact with the plurality of valves 7. The plurality of knobs 4 is integrated into the enclosure 1, thus providing convenient user access to the plurality of knobs 4. Each of the plurality of knobs 4 is positioned adjacent to a corresponding valve. This arrangement allows each of the plurality of knobs 4 to interact easily with the plurality of valves 7. Each of the plurality of knobs 4 is operatively coupled to the corresponding valve, wherein each of the plurality of knobs 4 is used to actuate the corresponding valve. In this way, modifications to the plurality of knobs 4 affect the state of the corresponding valve and subsequently controls the amount of gas flowing through the plurality of gas-dispensing tubes 8. Furthermore, each of the plurality of gas-dispensing tubes 8 comprises a tube body 9, a plurality of first holes 10, and a plurality of second holes 11, as seen in FIG. 6. The plurality of first holes 10 and the plurality of second holes 11 are a series of circular cuts through the tube body 9 of each of the plurality of gas-dispensing tubes 8. The plurality of first holes 10 laterally traverses into the tube body 9. Conversely, the plurality of second holes 11 laterally traverses into the tube body 9, opposite to the plurality of first holes 10. This pattern of the plurality of first holes 10 and the plurality of second holes 11 allows the combustible gas to escape the tube body 9. The plurality of first holes 10 and the plurality of second holes 11 are distributed along the tube body 9. In this way, the combustible gas flows evenly throughout the enclosure 1 by the closed end 3. Further, the plurality of first holes 10 and the plurality of second holes 11 are positioned parallel to the closed end 3. This arrangement ensures that the combustible gas fills the enclosure evenly, so that in the event of a combustible gas buildup, combustible gas and the pressure associated with it can escape easily.

Figure 8:
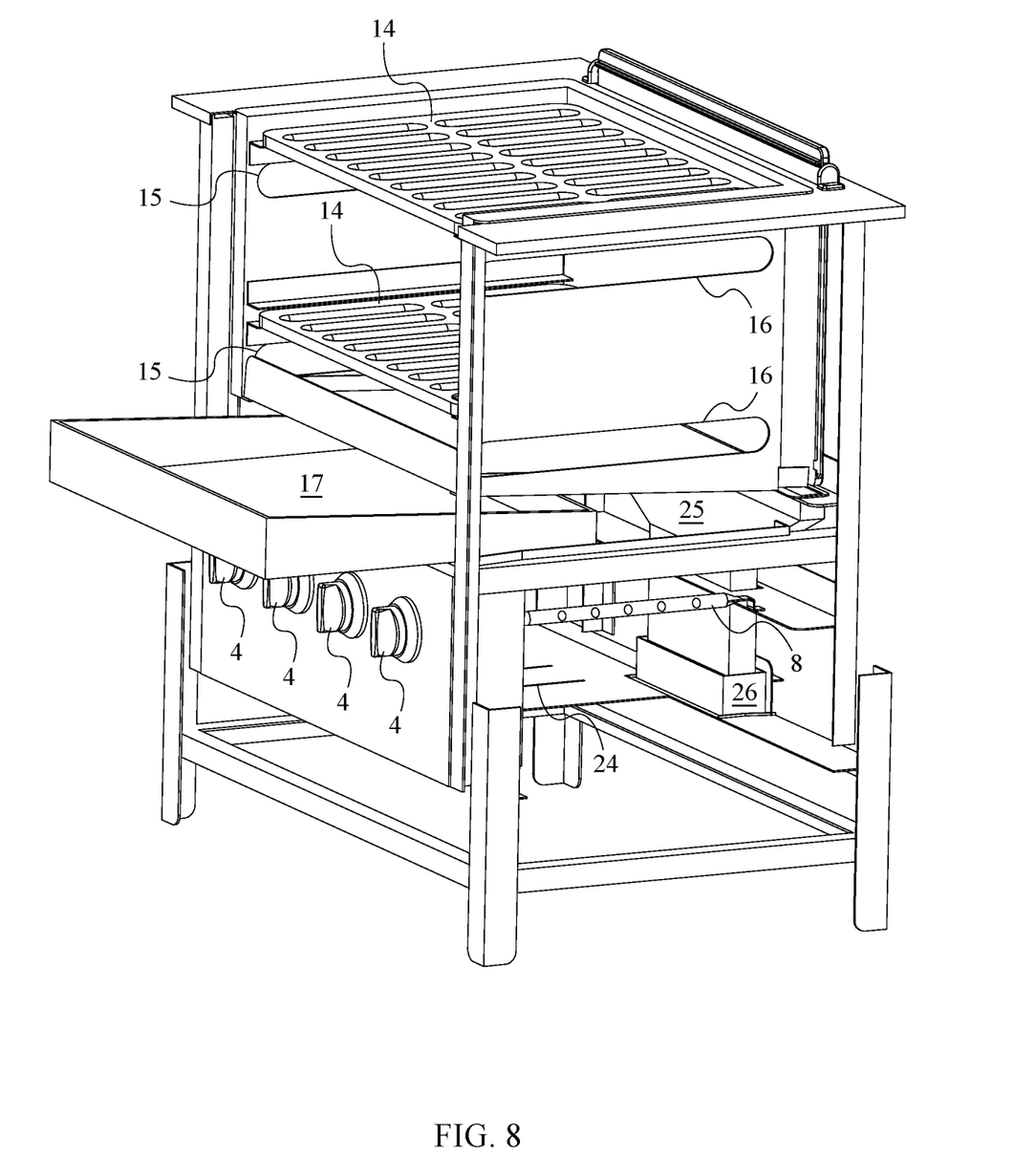
FIG. 8 is a front-right perspective view of the present invention without the first duct and the second duct.

The enclosure 1 further comprises a plurality of vents 24, seen in FIG. 8. The plurality of vents 24 is a series of cuts through the closed end 3 that allow for air to flow into the enclosure 1. The plurality of vents 24 traverses through the closed end 3. This enables air to enter for ignition purposes. Simultaneously, the plurality of vents 24 prevents potential fire hazards due to accidentally leaving gas flowing through the enclosure 1, as built-up combustible gas would expel through the plurality of vents 24.

The heat source 5 provides ample heat and control for cooking food in the at least one convectively-heated cooking mechanism 13. In an exemplary embodiment, the at least one convectively-heated cooking mechanism 13 is a single mechanism. The single mechanism comprises a grate 14, a first slot 15, and a second slot 16. The grate 14 is a heat-conductive metal surface that enables capture and subsequent transferal of heat. The width of the grate 14 provides a large cooking area for the user. The first slot 15 and the second slot 16 are spaces through which heat flows into the single mechanism. The grate 14 is removably mounted between the first duct 19 and the second duct 20. This arrangement allows the user to remove the grate 14 for cleaning and maintenance of the present invention. The first slot 15 laterally traverses into the first duct 19, adjacent to the grate 14. This arrangement ensures that heat flowing through the first duct 19 can easily enter the single mechanism and heat the grate 14. The second slot 16 laterally traverses into the second duct 20, adjacent to the grate 14. This arrangement ensures that heat flowing through the second duct 20 can easily enter the single mechanism and heat the grate 14. The single mechanism further comprises a drip pan 17. The drip pan 17 is a wide collector of grease, juices, and other cooking byproducts that are not meant to be consumed. The drip pan 17 is removably mounted in between the first duct 19 and the second duct 20. This arrangement allows the user to remove the drip pan 17 for cleansing and maintenance of the present invention. The first slot 15 and the second slot 16 are positioned in between the grate 14 and the drip pan 17. In this way, heat flowing from the heat source 5 through the first duct 19 and the second duct 20 flows up to directly heat the grate 14, instead of directly heating the drip pan 17.

Figure 5:
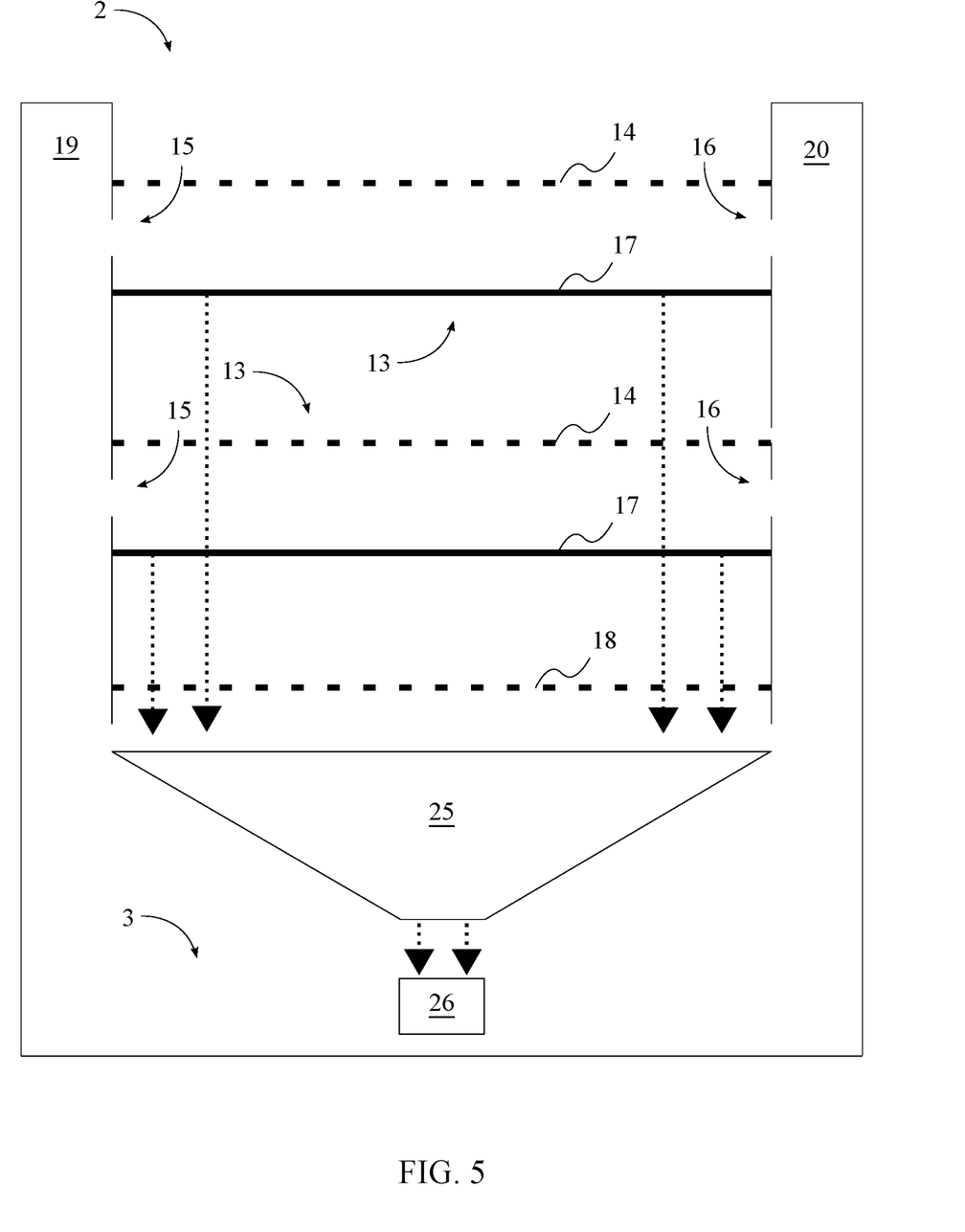
FIG. 5 is a front internal schematic view of the waste removal system.

When cooking, and grilling in particular, many foods tend to expel fluids which can disrupt the cooking process. To this end, the present invention further comprises a grease-collecting funnel 25 and a receptacle 26, as seen in FIG. 5. The grease-collecting funnel 25 is a collector positioned adjacent to the drip pan 17. The receptacle 26 is an open-ended container that is used to receive the contents flowing out of the grease-collecting funnel 25. The receptacle 26 is removably mounted within the enclosure 1. Such positioning allows the user to remove and empty the receptacle 26 as necessary, such as when the receptacle 26 becomes full of waste liquid. The grease-collecting funnel 25 is mounted within the enclosure 1, providing a mechanism for collecting excessive grease and other cooking waste. The drip pan 17 for the single mechanism is in fluid communication with the receptacle 26 through the grease-collecting funnel 25. In this way, fluid upon the drip pan 17 drips down into the grease-collecting funnel 25, which in turn directs that grease into the receptacle 26.

In an alternative embodiment, the at least one convectively-heated cooking mechanism 13 is a plurality of mechanisms. Each of the plurality of mechanisms is positioned offset from each other. This arrangement ensures that items placed on the grate 14 of each of the plurality of mechanisms have adequate space for cooking and for ease of removal. Each of the plurality of mechanisms similarly comprises a grate 14, a first slot 15, and a second slot 16. The grate 14 is a heat-conductive metal surface that enables capture and subsequent transferal of heat. The width of the grate 14 provides a large cooking area for the user. The first slot 15 and the second slot 16 are spaces through which heat flows into the plurality of mechanisms. The grate 14 is removably mounted between the first duct 19 and the second duct 20. This arrangement allows the user to remove the grate 14 of each of the plurality of mechanisms for cleaning and maintenance of the present invention. The first slot 15 laterally traverses into the first duct 19, adjacent to the grate 14. This arrangement ensures that heat flowing through the first duct 19 can easily enter the plurality of mechanisms and heat each grate 14. The second slot 16 laterally traverses into the second duct 20, adjacent to the grate 14. This arrangement ensures that heat flowing through the second duct 20 can easily enter the single mechanism and heat the grate 14. Each of the plurality of mechanisms further comprises a drip pan 17. The drip pan 17 is a wide collector of grease, juices, and other cooking byproducts that are not meant to be consumed. The drip pan 17 is removably mounted in between the first duct 19 and the second duct 20. This arrangement allows the user to remove the drip pan 17 for cleansing and maintenance of the present invention. The first slot 15 and the second slot 16 are positioned in between the grate 14 and the drip pan 17. In this way, heat flowing from the heat source 5 through the first duct 19 and the second duct 20 flows up to directly heat the grate 14, instead of directly heating the drip pan 17.

When cooking, and grilling in particular, many foods tend to expel fluids which can disrupt the cooking process. To this end, the present invention further comprises a grease-collecting funnel 25 and a receptacle 26. The grease-collecting funnel 25 is a collector positioned adjacent to the drip pan 17. The receptacle 26 is an open-ended container that is used to receive the contents flowing out of the grease-collecting funnel 25. The receptacle 26 is removably mounted within the enclosure 1. Such positioning allows the user to remove and empty the receptacle 26 as necessary, such as when the receptacle 26 becomes full of waste liquid. The grease-collecting funnel 25 is mounted within the enclosure 1, providing a mechanism for collecting excessive grease and other cooking waste. The drip pan 17 for the plurality of mechanisms is in fluid communication with the receptacle 26 through the grease-collecting funnel 25. In this way, fluid upon the drip pan 17 drips down into the grease-collecting funnel 25, which in turn directs that grease into the receptacle 26.

Although the invention has been explained in relation to its preferred embodiment, it is to be understood that many other possible modifications and variations can be made without departing from the spirit and scope of the invention as hereinafter claimed.

What is claimed is:

1. A multi-leveled cooking apparatus-comprising:
an enclosure;
a heat source;
at least one convectively-heated cooking mechanism;
a radiatively-heated cooking mechanism;
a first duct;
a second duct;
the enclosure-comprising an open end and a closed end;
the heat source, the radiatively-heated cooking mechanism, the at least one convectively-heated cooking mechanism, the first duct, and the second duct being mounted within the enclosure;
the heat source being positioned adjacent to the closed end;
the radiatively-heated cooking mechanism being positioned offset from the heat source;
the at least one convectively-heated cooking mechanism being positioned offset from the radiatively-heated cooking mechanism, opposite the heat source;
the first duct and the second duct traversing from the closed end to the open end; the first duct and the second duct being positioned opposite to each other about the enclosure;
the heat source being in fluid communication with the at least one convectively-heated cooking mechanism through the first duct and the second duct;
the at least one convectively-heated cooking mechanism comprising a grate, a first slot, a second slot and a drip pan;
the grate being removably mounted in between the first duct and the second duct;
the drip pan being removably mounted in between the first duct and the second duct; and
the first slot laterally traversing into the first duct, adjacent to the grate and the drip pan;
the second slot laterally traversing into the second duct, adjacent to the grate and the drip pan;
the first slot and the second slot each being positioned in between the grate and the drip pan;
the heat source-comprising a manifold, a plurality of gas-dispensing tubes, a plurality of valves, and an ignition starter;
the plurality of gas-dispensing tubes being positioned parallel to each other;
the plurality of gas-dispensing tubes being distributed across the closed end;
the manifold being positioned perpendicular to the plurality of gas-dispensing tubes;
each of the plurality of gas-dispensing tubes being in fluid communication with the manifold through a corresponding valve from the plurality of valves; and
the ignition starter being integrated into the enclosure, adjacent to a peripheral tube from the plurality of gas-dispensing tubes.

2. The multi-leveled cooking apparatus as described in claim 1 comprising:
an access door;
the access door being laterally integrated into the enclosure;
the access door being positioned in between the open end and the closed end; and
the access door being positioned adjacent to the radiatively-heated cooking mechanism.

3. The multi-leveled cooking apparatus as described in claim 1 comprising:
a hood; and
the hood being hingedly connected to the enclosure, adjacent to the open end.

4. The multi-leveled cooking apparatus as described in claim 3 comprising:
wherein the hood and the enclosure are in a closed configuration; and
the hood being hermetically attached onto the open end.

5. The multi-leveled cooking apparatus as described in claim 3 comprising:
a temperature gauge;
the temperature gauge being externally connected to the hood; and
the temperature gauge being in fluid communication with the enclosure.

6. The multi-leveled cooking apparatus as described in claim 1 comprising:
the enclosure comprising a plurality of knobs;
the plurality of knobs being integrated into the enclosure;
each of the plurality of knobs being positioned adjacent to the corresponding valve; and
each of the plurality of knobs being operatively coupled to the corresponding valve, wherein each of the plurality of knobs is used to actuate the corresponding valve.

7. The multi-leveled cooking apparatus as described in claim 1 comprising:
each of the plurality of gas-dispensing tubes comprising a tube body, a plurality of first holes and a plurality of second holes;
the plurality of first holes laterally traversing into the tube body;
the plurality of second holes laterally traversing into the tube body, opposite to the plurality of first holes;
the plurality of first holes being distributed along the tube body;
the plurality of second holes being distributed along the tube body; and
the plurality of first holes and the plurality of second holes being positioned parallel to the closed end.

8. The multi-leveled cooking apparatus as described in claim 1 comprising:
the enclosure comprising a plurality of vents; and
the plurality of vents traversing through the closed end.

9. The multi-leveled cooking apparatus as described in claim 1 comprising:
a grease-collecting funnel;
a receptacle;
the receptacle being removably mounted within the enclosure;
the grease-collecting funnel being mounted within the enclosure; and
the drip pan for the at least one convectively-heated cooking mechanism being in fluid communication with the receptacle through the grease-collecting funnel.

10. The multi-leveled cooking apparatus as described in claim 1 comprising:

the at least one convectively-heated cooking mechanism being a plurality of convectively-heated cooking mechanisms;
the plurality of convectively-heated cooking mechanisms being positioned offset from each other.

\* \* \* \* \*